United States Patent [19]

Kato

[11] Patent Number: 5,864,586
[45] Date of Patent: Jan. 26, 1999

[54] RADIO APPARATUS WITH OFFSET COMPENSATING CIRCUIT

[75] Inventor: Takashi Kato, Sagamihara, Japan

[73] Assignee: U.S. Philips Corporation, New York, N.Y.

[21] Appl. No.: 768,354

[22] Filed: Dec. 17, 1996

[30] Foreign Application Priority Data

Dec. 18, 1995 [JP] Japan ................................. 7-347528

[51] Int. Cl.[6] .......................... H04L 27/18; H04L 25/03; H01Q 11/12
[52] U.S. Cl. .......................... 375/297; 375/308; 375/296; 455/126
[58] Field of Search .................................. 375/297, 298, 375/308, 261, 296, 281, 285, 284; 455/126; 332/103; 329/304

[56] References Cited

U.S. PATENT DOCUMENTS

| | | | |
|---|---|---|---|
| 4,933,986 | 6/1990 | Leitch | 455/126 |
| 5,483,681 | 1/1996 | Bergsten et al. | 455/126 |
| 5,613,226 | 3/1997 | Kanami | 455/126 |

Primary Examiner—Stephen Chin
Assistant Examiner—Betsy L. Deppe
Attorney, Agent, or Firm—Dicran Halajian

[57] ABSTRACT

A radio apparatus is disclosed which includes a modulator that modulates an input signal having an input offset voltage held by an input sample and hold circuit and outputs an output signal having an output offset voltage. A demodulator of the radio apparatus demodulates the output signal and outputs a demodulated signal. The radio apparatus also has an offset compensating circuit which makes the output offset voltage coincide with a demodulated offset voltage of the demodulated signal by comparing the input offset voltage with the demodulated signal in order to output a feedback signal to the modulator.

11 Claims, 7 Drawing Sheets

RADIO APPARATUS WITH OFFSET COMPENSATING CIRCUIT

FIELD OF THE INVENTION

The present invention relates to a radio apparatus for transmitting a modulated wave signal modulated by a quadrature amplitude modulation (QAM) by means of a time division multiple access (TDMA) method, and particularly to improvement of its linear characteristics when amplifying the modulated wave signal.

BACKGROUND OF THE INVENTION

A multichannel access (MCA) system is a system in which different users share the use of plural channels, and is also used widely for business use. And the MCA system is also used in various kinds of data communications in addition to a radio communication for voice.

The number of users in the MCA system has been rapidly increased in recent years, and systems suitable for data transmission are also in great demand. Thus, specifications of a digital MCA system have come to be determined and turned to practical use.

In such a system as this, a multilevel quadrature amplitude modulation (QAM) is used and for example, a multilevel quadrature amplitude modulation is used which may have states of 16 levels by performing a 4-level amplitude modulation by means of the respective two carrier waves different in phase by 90 degrees from each other.

In a digital MCA system of STD-32 set as a standard of Research & Development Center for Radio Systems, Incorporated Foundation (RCR) for a modulation method of a digital MCA system, an M16QAM method is adopted and four subcarriers are assumed to be used.

Such a system as this is composed to perform a time division transmission by means of a time division multiple access (TDMA) method so that plural radio stations can use the same frequency.

Now, a multilevel QAM modulated signal can be represented by the following expressions;

$$I(t) = A \cos \Phi(t) \quad (1),$$

$$Q(t) = A \sin \Phi(t) \quad (2).$$

Namely, the multilevel QAM modulated signal is modulated so as to have information of phase and amplitude. Such a modulated wave signal having information of phase and amplification as this needs to have an amplification with excellent linear characteristics applied to it. In case of thinking much of the linear characteristics, a class-A amplification is desired to be performed, but has a problem that it is poor in efficiency.

On the other hand, a radio apparatus used in mobile communication needs an amplification high in efficiency so as to suppress its battery consumption. Therefore, a power amplification stage in a mobile radio apparatus or in a portable radio apparatus used in mobile communication performs a class-AB amplification rather than a class-A amplification.

Thus, a circuit called a linearity compensation circuit (linearizer) of Cartesian-loop method is used as a linear-characteristics compensation means for keeping a high accuracy by suppressing distortion in phase and amplitude liable to be caused by a class-AB amplification.

FIG. 9 is a structural diagram showing a radio apparatus performing a linearity compensation by means of a linearizer. In FIG. 9, digital data generated by a DSP 101 are converted by D/A converters 102 and 103 into analog data. The analog data are signals (I signal and Q signal) which have direct-current offset voltages and are of waveform oscillating around the offset voltages. The analog data are orthogonally modulated by a quadrature modulator 104. The quadrature modulator 104 receives a quadrature local oscillation signal from an OSC 105 and generates a transmission IF signal. And a transmission IF circuit 106 IF-amplifies the transmission IF signal having a frequency (IF frequency) of the OSC 105, and a frequency converter 107 converts the frequency of the IF-amplified signal into a desired frequency by means of a local oscillation signal from an OSC 108 to generate a transmission signal. And a power amplifying circuit 109 power-amplifies the transmission signal having the desired frequency by means of a class-AB amplification and the like.

At this time, an attenuator 201 attenuates a part of the transmission signal from the power amplifying circuit 109 and a linearizer IF circuit 203 IF-amplifies the transmission signal whose frequency has been converted to the IF frequency by the local oscillation signal from the OSC 108. And the signal of IF frequency is orthogonally demodulated by the quadrature local oscillation signal from the OSC 105 in a quadrature demodulator 204. The transmission signal orthogonally demodulated in this manner is supplied to the quadrature modulator 104 as a feedback signal and a negative feedback is performed inside the quadrature modulator 104. Such a negative feedback makes it possible to keep linear characteristics of high accuracy by suppressing distortion in phase and amplitude generated in the power amplifying circuit 109 and the like.

(1) In case of applying the above-mentioned negative feedback, a potential slippage in an offset voltage contained in a feedback signal becomes a problem. Namely, since a baseband bandwidth of a transmission signal includes the vicinity of its direct-current component, the offset voltage cannot be removed from the feedback signal.

However, a slippage in direct-current potential (offset voltage) between signals generated by the D/A converters 102 and 103 and a feedback signal generated by the quadrature demodulator 204 is generated due to a little difference in characteristics of the respective circuits of the D/A converters, the quadrature modulator and the quadrature demodulator, variation of temperature and the like. The slippage in direct-current voltage is greatly amplified when applying a great amount of negative feedback, which may reversely deteriorate the linear characteristics of the power amplification stage.

Up to now, therefore, parameters of the various parts have been fixed by manually adjusting the offset voltage. However, since some error is caused by aging or variation of temperature, there is a problem that it is difficult to obtain stable characteristics. And there is also a problem that the adjusting operation by hand itself is complicated.

Although there is a technique for automatically adjusting a slippage of the offset voltage only in a quadrature modulator, there is not an apparatus for automatically adjusting a slippage in offset voltage all over the transmission and the negative feedback system as described above.

Therefore, it has been expected to materialize a radio apparatus capable of automatically adjusting a slippage in offset voltage between the transmission system and the negative feedback system in a radio apparatus using a linearizer as described above.

(2) Further, when performing the above-mentioned negative feedback, a phase difference between signals generated by the D/A converters 102 and 103 and a feedback signal generated by the quadrature demodulator 204 comes into question. Namely, a phase difference between the signals is caused by difference in length of physical paths and variation in circuit devices.

Such a phase difference is not preferable to applying of a negative feedback. Hence, it has been attempted to compensate the above-mentioned phase deference by adjusting in phase either one of local oscillation signals to be supplied to the quadrature modulator and the quadrature demodulator.

A method of adjusting a variable resistor of a phase shifter composed of an electrical circuit is thought as such a phase adjustment. In this case, up to now, parameters of the various parts have been fixed by manually adjusting the offset voltage. However, since some error is caused by aging or variation of temperature, there is a problem that it is difficult to obtain stable characteristics. And there is also a problem that the adjusting operation by hand itself is complicated.

Further, a method of adjusting physical paths in length or the like is thought as another phase adjusting method. Although such a method is not as susceptible to aging or variation of temperature as the variable resistor adjusting method, an apparatus where physical paths are adjusted has an increased size and high cost.

Furthermore, in case that the apparatus is used in a frequency different from the frequency in which a phase adjustment has been made, any of the phase adjusting methods has a problem that a further phase lead or phase lag is caused by variation of LC components of the circuit devices and variation in electrical path length. In case of changing a transmission frequency of a radio apparatus, linear characteristics of the power amplification stage may be reversely deteriorated by the negative feedback of the linearizer.

Therefore, it has been expected to materialize a radio apparatus capable of automatically adjusting a slippage in offset voltage between the transmission system and the negative feedback system in a radio apparatus using a linearizer as described above.

(3) Further, since a multilevel QAM modulated signal needs to be amplified accurately in both of phase and amplitude, it has been also expected to materialize a radio apparatus capable of compensating linear characteristics of the power amplification stage by means of a negative feedback of a linearizer by automatic adjusting both of such an offset voltage and a phase difference as described above.

SUMMARY OF THE INVENTION

The present invention has been made in consideration of the above-mentioned points, and the first object of the invention is to materialize a radio apparatus capable of automatically adjusting a slippage in offset voltage between the transmission system and the negative feedback system in case of using a linearizer.

The second object is to materialize a radio apparatus capable of automatically adjusting a phase difference between the transmission system and the negative feedback system even when changing its transmission frequency in case of using a linearizer.

And the third object is to materialize a radio apparatus capable of automatically adjusting both of an offset voltage and a phase difference in case of using a linearizer.

As a result of research for improving a disadvantage that a slippage in offset voltage or in phase is generated by negative feedback in an existing radio apparatus using a linearizer, the inventors of the present invention being filed have completed the invention by making it possible to adjust a slippage in voltage or phase for each slot as paying their attention to that a TDMA communication system performs intermittently a transmission in each slot.

Therefore, the present invention for solving the above-mentioned problems is composed as described in the following items (1) to (3).

(1) A first embodiment of the invention is a radio apparatus which compensates linear characteristics of a power amplification stage by feeding back to a quadrature modulator a signal component obtained by quadrature demodulation of a transmission signal detected from the power amplification stage at a transmission slot timing repeated at intervals of a specified time, said radio apparatus comprising an error voltage compensating means for making the respective offset voltages of signal components obtained by quadrature demodulation coincide with the respective offset voltages of signal components obtained by quadrature modulation by comparing the respective offset voltages of the signal components obtained by the quadrature demodulation during non-transmission periods with the respective offset voltages of the signal components obtained by the quadrature modulation. The non-transmission periods are periods other than transmission slot timing periods.

In this radio apparatus, an error voltage compensating means makes the respective offset voltages of signal components obtained by quadrature demodulation coincide with the respective offset voltages of signal components obtained by quadrature modulation by comparing the respective offset voltages of the signal components obtained by the quadrature demodulation during the non-transmission periods with the respective offset voltages of the signal components obtained by the quadrature modulation. When making the offset voltages coincide with each other in such a manner, the error voltage compensating means samples and holds the signals during the non-transmission periods.

Accordingly, in case of using a linearizer, it is possible to automatically adjust a slippage in offset voltage between the transmission system and the negative feedback system. Further, the adjustment of a slippage in offset voltage is performed in each transmission slot.

As the result, a compensation of linear characteristics of the power amplification stage by a linearizer is accurately performed.

(2) A second embodiment of the invention is a radio apparatus which compensates linear characteristics of a power amplification stage by feeding back to a quadrature modulator a signal component obtained by quadrature demodulation of a transmission signal detected from the power amplification stage at a transmission slot timing repeated at intervals of a specified time, said radio apparatus comprising a phase adjusting means for making a signal component obtained by quadrature demodulation of a transmission signal coincide in phase with a signal component obtained by quadrature modulation through adjusting in phase a local oscillation signal to be supplied to the quadrature demodulator.

In this radio apparatus, a phase adjusting means makes a signal component obtained by quadrature demodulation of a transmission signal coincide in phase with a signal component obtained by quadrature modulation through adjusting in phase a local oscillation signal to be supplied to the quadrature demodulator. In case of making the signals coincide in phase with each other, it is preferable to utilize a preamble part sent at the beginning of a transmission slot. Namely, since the preamble part is contained only in an I signal, it will do to make a phase adjustment so that a Q signal which is a feedback signal may become zero in amplitude.

Accordingly, in case of using a linearizer, it is possible to automatically adjust a slippage in phase between the transmission system and the negative feedback system.

As for such adjustment of a slippage in phase, two methods are thought, one of which is to perform adjustment in a preamble period of each transmission slot and the other of which is to perform adjustment until a slippage in phase is made zero within a preamble period. In any case of these, adjustment of a slippage in phase is performed in an instant even when a transmission frequency is changed.

As the result, a compensation of linear characteristics of the power amplification stage by a linearizer is accurately performed.

(3) A third embodiment of the invention is a radio apparatus which compensates linear characteristics of a power amplification stage by feeding back to a quadrature modulator a signal component obtained by quadrature demodulation of a transmission signal detected from the power amplification stage at a transmission slot timing repeated at intervals of a specified time, said radio apparatus comprising;

an error voltage compensating means for making the respective offset voltages of signal components obtained by quadrature demodulation coincide with the respective offset voltages of signal components obtained by quadrature modulation through comparing the respective offset voltages of the signal components obtained by the quadrature demodulation during the other periods than transmission slot timing periods with the respective offset voltages of the signal components obtained by the quadrature modulation, and a phase adjusting means for making a signal component obtained by quadrature demodulation of a transmission signal coincide in phase with a signal component obtained by quadrature modulation through adjusting in phase a local oscillation signal to be supplied to the quadrature demodulator.

In this radio apparatus, an error voltage compensating means makes the respective offset voltages of signal components obtained by quadrature demodulation coincide with the respective offset voltages of signal components obtained by quadrature modulation through comparing the respective offset voltages of the signal components obtained by the quadrature demodulation during the other periods than transmission slot timing periods with the respective offset voltages of the signal components obtained by the quadrature modulation. When making the offset voltages coincide with each other in such a manner, the error voltage compensating means samples and holds the signals during the other periods than the transmission slot timing periods.

Further, a phase adjusting means makes a signal component obtained by quadrature demodulation of a transmission signal coincide in phase with a signal component obtained by quadrature modulation through adjusting in phase a local oscillation signal to be supplied to the quadrature demodulator. In case of making the signals coincide in phase with each other, it is preferable to utilize a preamble part sent at the beginning of a transmission slot. Namely, since the preamble part is contained only in an I signal, it will do to make a phase adjustment so that a Q signal which is a feedback signal may become zero in amplitude.

Accordingly, in case of using a linearizer, it is possible to automatically adjust a slippage in offset voltage and a slippage in phase between the transmission system and the negative feedback system. In addition, the automatic adjustment of these slippages is performed in each transmission slot. And the adjustment of these slippages in voltage and in phase is performed in each transmission slot. Therefore, adjustment of the slippages is performed in an instant even when a transmission frequency is changed.

As the result, a compensation of linear characteristics of the power amplification stage by a linearizer is accurately performed.

BRIEF DESCRIPTION OF THE DRAWINGS

With reference to the drawings, embodiments of the present invention are described in detail in the following.

DESCRIPTION OF PREFERRED EMBODIMENTS

Figure 1:
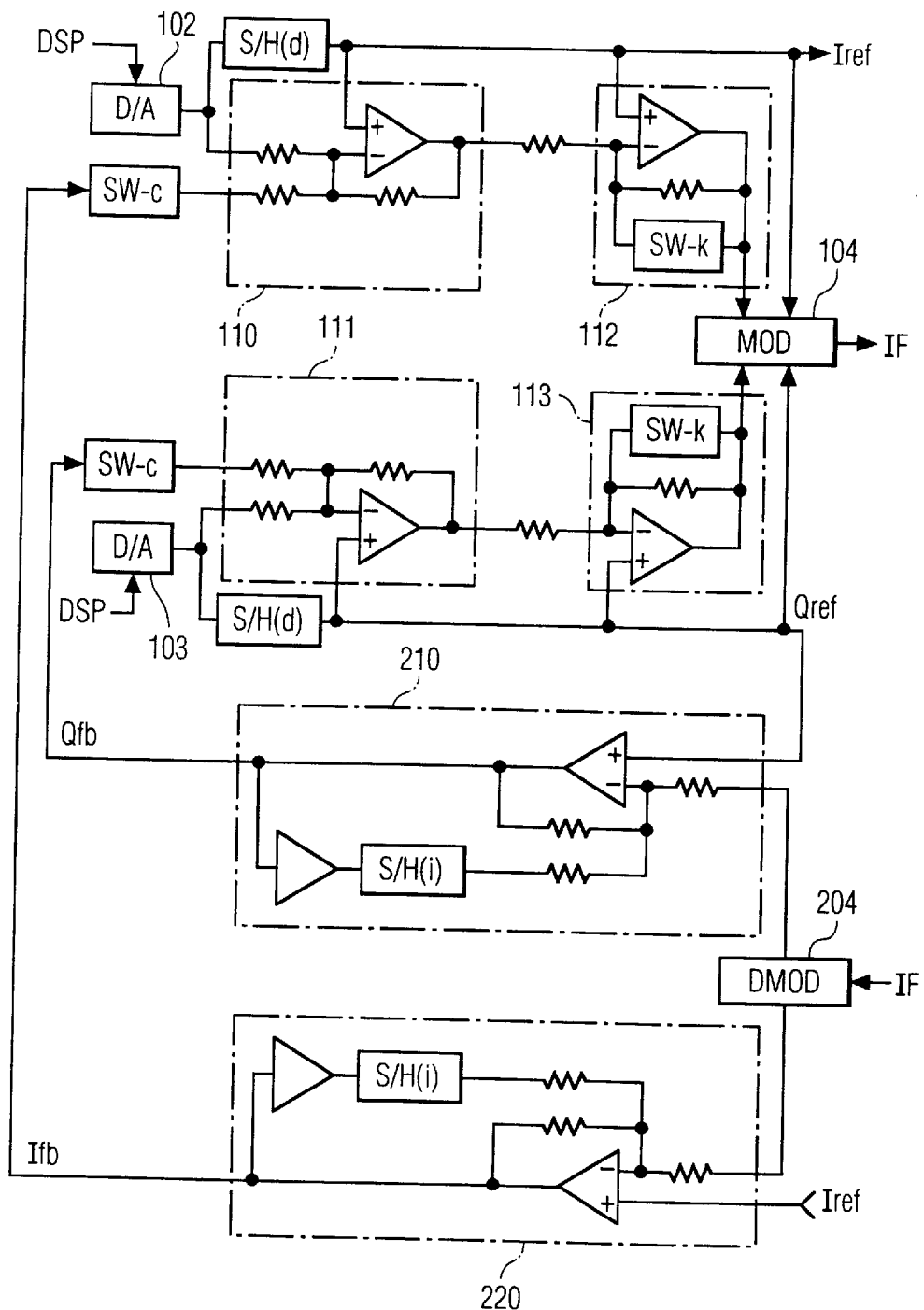
FIG. 1 is a structural diagram showing a radio apparatus of a first embodiment of the invention.
Figure 2:
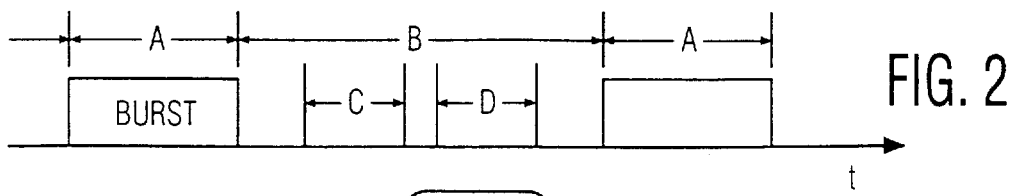
FIG. 2 is a timing chart showing the aspect of a transmission slot.
Figure 3:
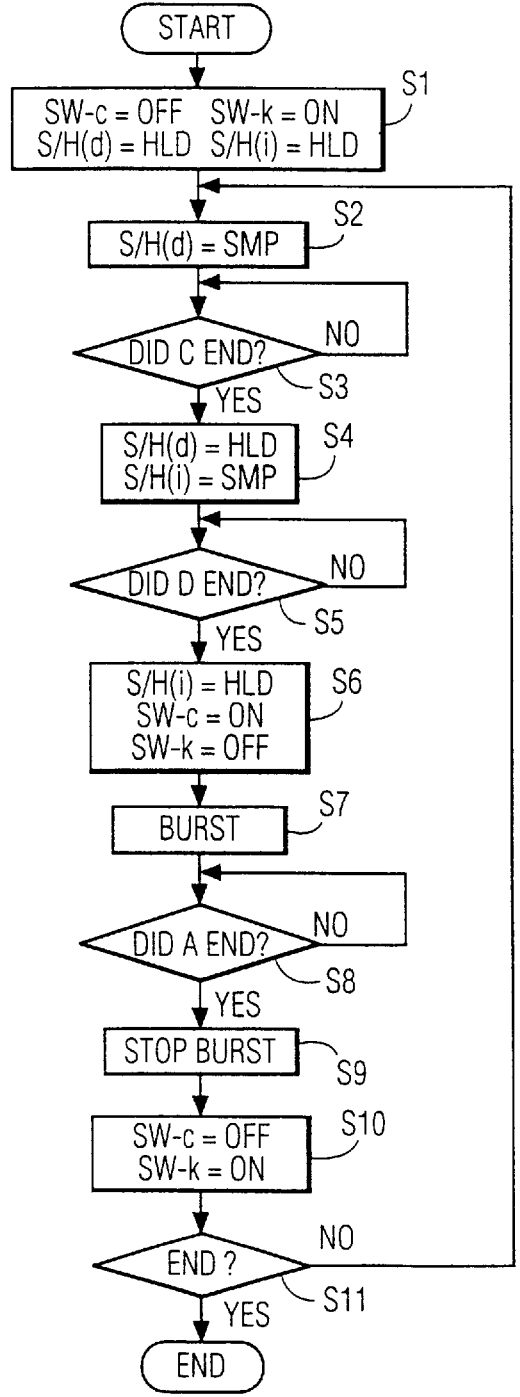
FIG. 3 is a flowchart showing operation of the radio apparatus of the first embodiment of the invention.
Figure 9:
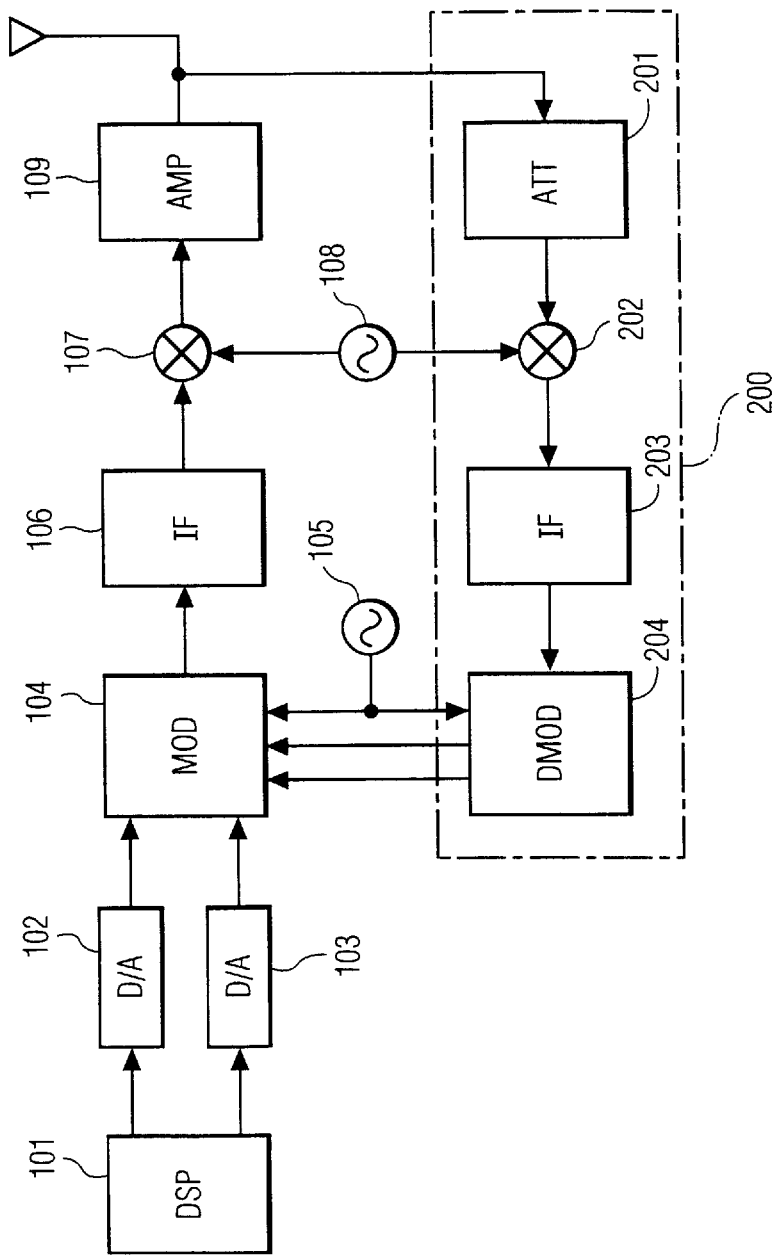
FIG. 9 is a structural diagram showing an existing radio apparatus using a linearizer.

FIG. 1 is a structural diagram showing a fundamental composition of the main part of a radio apparatus of a first embodiment of the invention, and the same numbers as those in FIG. 9 are attached to the same components as shown in FIG. 9 showing the whole composition already explained. FIG. 2 is a timing chart showing the aspect of a transmission slot in a TDMA communication system and FIG. 3 is a flowchart showing operation of the first embodiment.

In a radio apparatus shown in FIG. 1, digital data for an I signal generated by a DSP is converted by a D/A converter 102 into analog data. The analog data is a signal which has a direct-current offset voltage and is of waveform vibrating around this offset voltage. And the analog data vibrates according to digital data in a transmission slot and keeps an offset voltage during the other periods than the transmission slot.

A sample holding circuit S/H (d) is controlled in its sampling and holding operations by a non-illustrated controller and the like (hereinafter referred to as a CPU) and outputs an Iref (hereinafter referred to as a reference offset voltage Iref) which is a reference to an offset voltage of an I signal.

An arithmetic and logic unit 110 performs a negative feedback by means of analog data from the D/A converter 102 and a feedback signal (I signal for feedback: Ifb) from the sample holding circuit S/H (i) and a switch SW-c described later. An amplifier 112, which is an amplifier for amplifying analog data given by negative feedback from the arithmetic and logic unit 110, has a switch SW-k for controlling an amplification degree controlled by the CPU. Analog data for an I signal and an Iref are supplied to a quadrature modulator 104.

Digital data for a Q signal generated by the DSP is converted into analog data by a D/A converter 103. The analog data is a signal which has a direct-current offset voltage and is of waveform oscillating around this offset voltage. And the analog data oscillates according to digital data in a transmission slot and keeps an offset voltage during the other periods than the transmission slot.

The sample holding circuit S/H (d) is controlled in its sampling and holding operations by a non-illustrated CPU and outputs a Qref (hereinafter referred to as a reference offset voltage Qref) which is a reference to an offset voltage of a Q signal. An arithmetic and logic unit 111 performs a negative feedback by means of analog data from the D/A converter 103 and a feedback signal (Q signal for feedback : Qfb) from the sample holding circuit S/H (i) and a switch SW-c described later. An amplifier 113, which is an amplifier for amplifying analog data given by negative feedback from the arithmetic and logic unit 111, has a switch SW-k for controlling an amplification degree controlled by the CPU. Analog data for a Q signal and the reference offset voltage Qref are supplied to the quadrature modulator 104.

And a modulated signal orthogonally modulated by the quadrature modulator 104 is supplied to a transmission IF circuit outside the figure.

On the other hand, a quadrature demodulator 204 orthogonally demodulates an IF signal from a linearizer IF circuit outside the figure to generate an I signal and a Q signal. The I signal is supplied to an error voltage compensating circuit 220 and the Q signal is supplied to an error voltage compensating circuit 210. Each of the I signal and the Q signal is a signal having a direct-current offset voltage and is of waveform oscillating around the offset voltage. These signals oscillate according to digital data in a transmission slot and keeps its offset voltage during the other periods than the transmission slot. The offset voltages of analog data generated by the above-mentioned D/A converters 102 and 103 are different from the offset voltages of the I signal and the Q signal due to influence of the circuit devices.

The error voltage compensating circuit 210 generates a Qfb as a Q signal for negative feedback by performing a level shift so as to make an offset voltage of the Q signal coincide with a reference offset voltage Qref with reference to the reference offset voltage Qref. Hence, the error voltage compensating circuit 210 is provided with a sample holding circuit S/H (i) controlled by an operational amplifier and the CPU.

Similarly, the error voltage compensating circuit 220 generates an Ifb as an I signal for negative feedback by performing a level shift so as to make an offset voltage of the I signal coincide with a reference offset voltage Iref with reference to the reference offset voltage Iref.

The SW-C composed as described above is intended for switching over passing/blocking an Ifb and a Qfb, and can be disposed somewhere inside a linearizer and be also used by another circuit device.

Operation of a radio apparatus composed as described above is described. This radio apparatus performs intermittently a transmission in slot by means of a TDMA communication method. FIG. 2 is a timing chart showing this behaviour, where the apparatus performs transmission as a burst signal during a period A. And it performs reception from and transmission to another radio apparatus during a period B. As paying attention to the period B, the invention sets two periods C and D within the period B so as to adjust a slippage in offset voltage of the linearizer.

In case of making adjustment in such a way, it is assumed that states of the switches SW-c and SW-k and the sample holding circuits S/H (d) and S/H (i) are controlled by the CPU during each of periods A, B (except periods C and D), C, and D as described in the following.

|  | SW-c, | SW-k, | S/H (d), | S/H (i) |
|---|---|---|---|---|
| Period A: | On, | Off, | Hold, | Hold |
| Period B: | Off, | On, | Uncertain, | Uncertain |
| Period C: | Off, | On, | Sample, | Hold |
| Period D: | Off, | On, | Hold, | Sample |

Operations in such states during the respective periods are described in detail with reference to the flowchart in FIG. 3.

First, the initial setting is set as "SW-c=Off, SW-k=On, S/H (d)=Hold, and S/H (h)=Hold" (S1 in FIG. 3). And in order to start from the period C as first described above, only offset voltages are outputted from the D/A converters 102 and 103. The offset voltages of the D/A converters 102 and 103 (transmission system) are sampled by setting "S/H (d)=Sample" (S2 in FIG. 3).

The offset voltages sampled during the period C are held during all the periods other than the period C and are supplied to the respective parts as reference voltages Iref and Qref.

Figure 4:
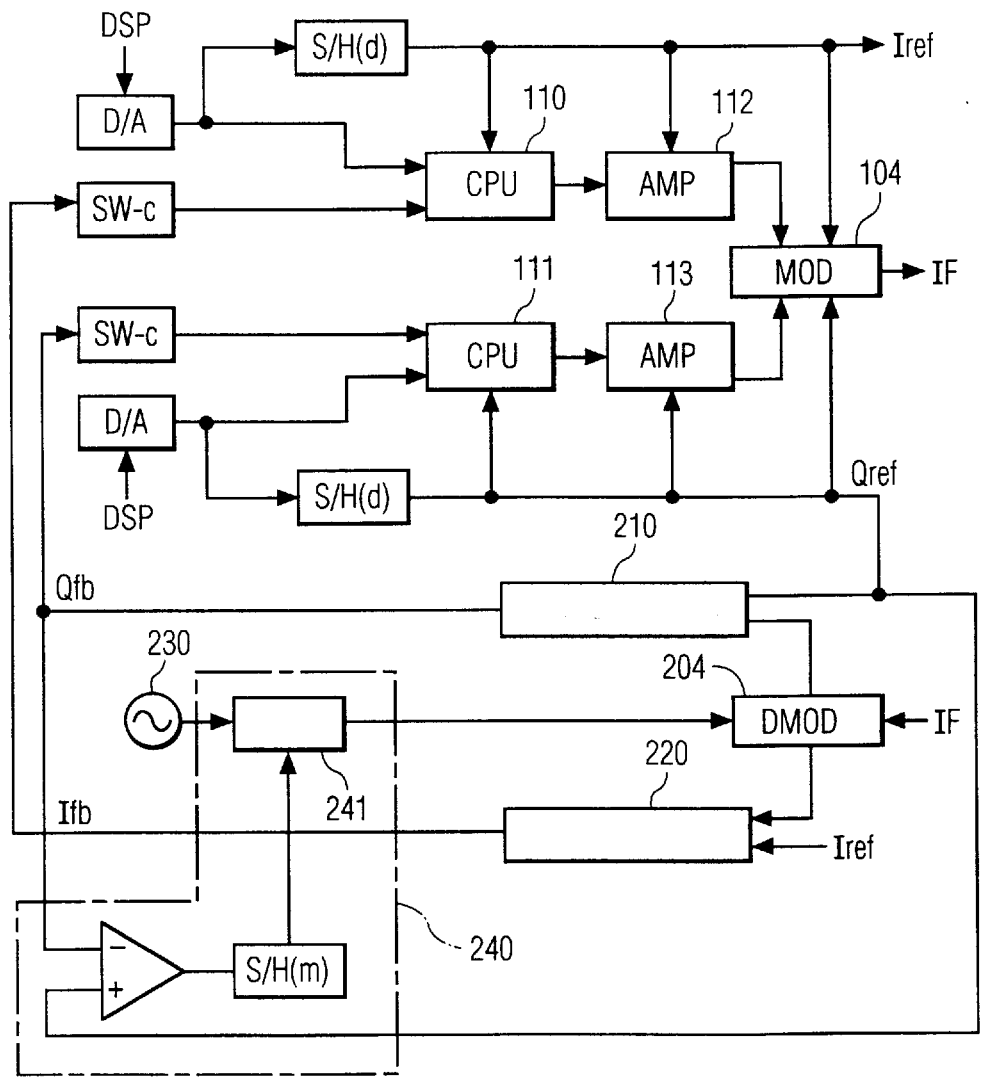
FIG. 4 is a structural diagram showing a radio apparatus of a second embodiment of the invention.

And for the period D, "S/H (i)=Sample" is set in the error voltage compensating circuits 210 and 220 (S4 in FIG. 4). Since this "S/H (i)=Sample" is a through state, a negative feedback circuit is formed out of operational amplifiers and amplifiers inside the error voltage compensating circuits 210 and 220. Regardless of the value of an offset voltage of the quadrature demodulator 204, therefore, the same voltage as the reference offset voltage Oref is outputted from the error voltage compensating circuit 210 and the same voltage as the reference offset voltage Iref is outputted from the error voltage compensating circuit 220.

And when the period D has ended (S5 in FIG. 3), the S/H(i) is held (S6 in FIG. 3) and a Qfb equal to the Qref and an Ifb equal to the Iref are outputted. Namely, during the period D, a level shift is performed in the error voltage compensating circuits 210 and 220 so as to compensate a slippage in offset voltage.

Since the SW-c is Off during the periods B, C and D, the Ifb and the Qfb from the linearizer are blocked from the arithmetic and logic units 110 and 111. Accordingly, outputs of the arithmetic and logic units 110 and 111 are made equal to offset voltages of the Iref and the Qref. At this time, since the SW-k is On, gains of the amplifiers 112 and 113 become 1 and they come to be exactly equal to offset voltages of the Iref and the Qref without being influenced by variations in offset current values and resistance values of the operational amplifiers. Hence, an I input and a Q input of the quadrature modulator 104, respectively, are made equal to the Iref and the Qref, and a transmission IF is not outputted. Therefore, the linearizer IF also comes to have no signal and the quadrature demodulator 204 also outputs only its specific offset voltage.

When the period A is started by the end of the period D, "SW-c=On" and "SW-k=Off" are set (S6 in FIG. 3) and a burst signal is outputted from the DSP (S7 in FIG. 3). In this case, a signal having an offset voltage and a burst signal superposed on each other is outputted from each of the D/A converters 102 and 103, and the offset voltages are subtracted in the arithmetic and logic units 110 and 111 by an I signal Ifb for feedback and a Q signal Qfb for feedback (feedback signals) which have passed through the SW-c. As a result of the subtraction of the feedback signals, baseband signals containing the offset voltages, respectively, equal to the Iref and the Qref are outputted from the arithmetic and logic units 110 and 111.

Since the baseband signals are small in amplitude, they are amplified by the amplifiers 112 and 113. At this time, since the SW-k is Off and the amplifiers 112 and 113 have a sufficient gain, the baseband signals are amplified to a voltage suitable as input of the quadrature modulator 104. Since the Iref is applied to the reference side of each of the operational amplifiers of the arithmetic and logic unit 110 and the amplifier 112, and the Qref is applied to the reference side of each of the operational amplifiers of the arithmetic and logic unit 111 and the amplifier 113, they are not influenced by offset voltages in negative feedback operation and signal amplification.

Further, since in the period A, feedback signals Ifb and Qfb (where an offset voltage and a burst signal which have been adjusted so that the Ifb and the Qfb, respectively, may be equal to the Iref and the Qref are superposed on each other) from the error voltage compensating circuits 210 and 220 are outputted from the linearizer, in the above-mentioned subtraction in the arithmetic and logic units 110 and 111 the offset voltages are exactly subtracted and then the negative feedback is performed.

Namely, in the period A which is a transmission slot, in all the path through which a baseband signal passes, an offset voltage equal to the offset voltage outputted by the D/A converter 102 is given to the I signal and in the same manner, an offset voltage equal to the offset voltage outputted by the D/A converter 103 is given to the Q signal. Therefore, such processing as operation, amplification, input and output in the respective parts can be performed without being influenced by the offset voltages, and a great amount of negative feedback performed by a linearizer can greatly improve the linear characteristics of the whole transmission circuit.

A burst signal from the DSP is stopped (S9 in FIG. 3) by the end of the period A (S8 in FIG. 3), and the system prepares for the following periods B and C by setting "SW-c=Off" and "SW-k=On" (SIO in FIG. 3). The radio apparatus is made so that this operation can be repeated so long as the radio apparatus continues to work (S11 to S2 in FIG. 3).

Namely, since in this radio apparatus the above-mentioned compensation of a slippage in offset voltage is automatically performed in each transmission slot, the above-mentioned effect can be kept to satisfactorily cope with aging and variation of temperature.

FIG. 4 is a structural diagram showing a fundamental composition of the main part of a radio apparatus of a second embodiment of the invention, and the same numbers as those in FIG. 9 are attached to the same components as shown in FIG. 9 showing the whole composition and as shown in FIG. 1 already explained.

Figure 5:
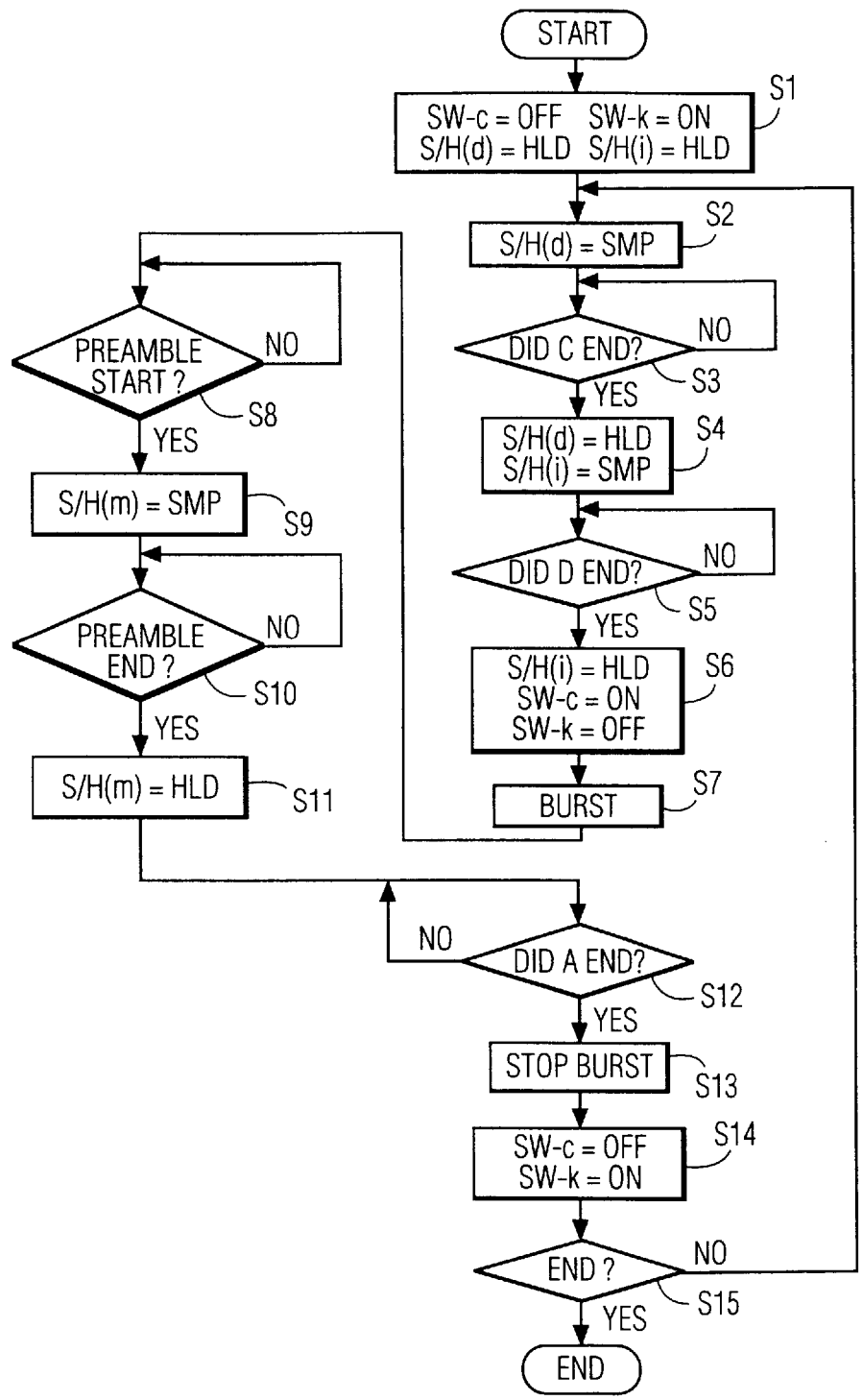
FIG. 5 is a flowchart showing operation of the radio apparatus of the second embodiment of the invention.
Figure 6:
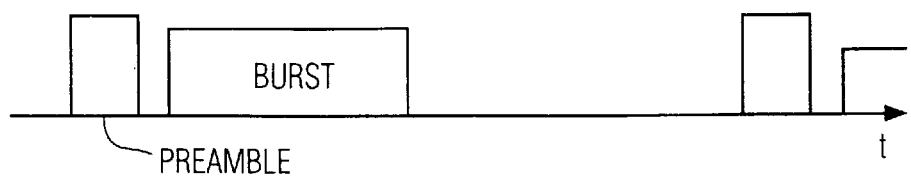
FIG. 6 is a timing chart showing the aspect of a transmission slot containing a preamble part.

FIG. 5 is a flowchart showing operation of the second embodiment, and FIG. 6 is a timing chart showing behaviour of a preamble part and a burst signal in a transmission slot of an M16QAM system.

A point in which a radio apparatus shown in FIG. 4 is different from the above-mentioned radio apparatus shown in FIG. 1 is that a phase of a local oscillation signal to be supplied to the quadrature demodulator 204 from a local oscillator 230 is adjusted by a phase adjusting part 240.

Namely, as described above, in case of performing transmission in a frequency different from the frequency in which a phase adjustment has been performed, a negative feedback function of a linearizer may not work well due to a further phase lead or phase lag caused by variation of LC components of the circuit devices and variation in electrical path length. Hence, a phase adjustment is performed by making a feedback signal Qfb in a preamble part equal to the reference signal Qref in voltage.

As shown in FIG. 6, in an M16QAM system, a preamble part is transmitted immediately before (at the beginning of) a burst signal. The preamble part, which is fixed in phase and amplitude, is contained only in an I signal. In case that a linearizer has a slippage in phase, therefore, some output comes to appear on the Q signal side also in a preamble period, as shown by the above-mentioned expressions (1) and (2). Then, by paying attention to the Qref and a Qfb in the preamble period, it is possible to judge that they coincide also in phase with each other in case that they coincide in amplitude with each other and that they are deviated in phase from each other in case that they are different in amplitude from each other.

Hence, an operational amplifier inside the phase adjusting part 240 compares the Qfb with the Qref and the sample holding circuit S/H (m) samples a result of comparison in the preamble period (S8 and S9 in FIG. 5). And at the end of the preamble period (S1O in FIG. 5), the sample holding circuit S/H (m) holds a result of comparison in the preamble period (S11 in FIG. 5).

According to the result of holding, the phase of a signal from the local oscillator 230 is adjusted so as to adjust a slippage in phase by means of a phase shifter 241.

Thus, the second object of the invention can be achieved by performing a phase adjusting process in the respective steps S8 to S11 in FIG. 5. Namely, in case of using a linearizer, it is possible to automatically adjust a slippage in phase between the transmission system and the negative feedback system. As the result, compensation of linear characteristics of the power amplification stage by the linearizer is accurately performed.

And the third object of the invention can be achieved by performing all the steps S1 to S15 in FIG. 5. Namely, in case of using a linearizer, it is possible to automatically adjust slippages in offset voltage and in phase between the transmission system and the negative feedback system. The automatic adjustment of these slippages is performed in each transmission slot. The adjustment of these slippages in voltage and in phase is performed in each transmission slot. Therefore, the slippages are adjusted in an instant even in case of changing a transmission frequency.

As the result, compensation of linear characteristics of the power amplification stage by the linearizer is accurately performed.

Figure 7:
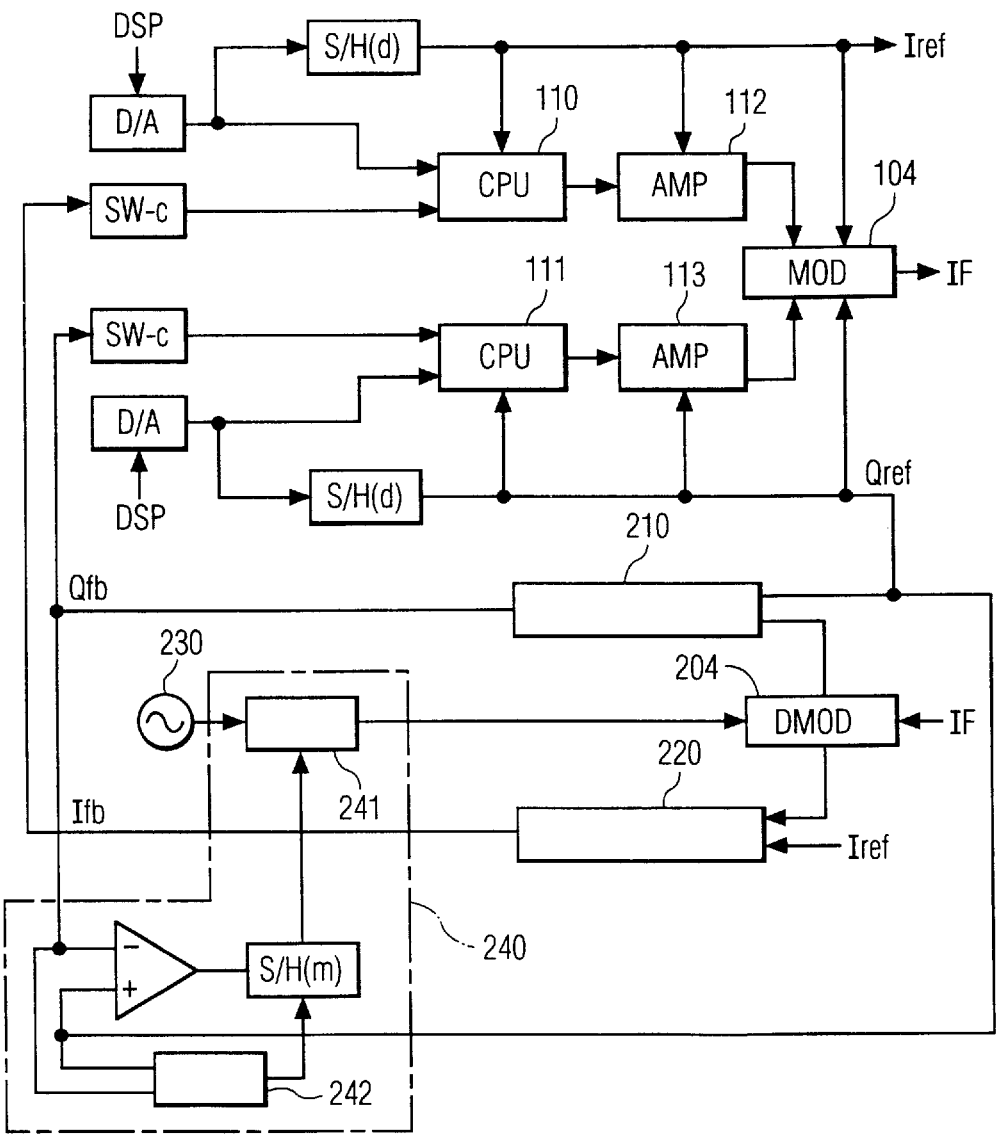
FIG. 7 is a structural diagram showing a radio apparatus of a third embodiment of the invention.
Figure 8:
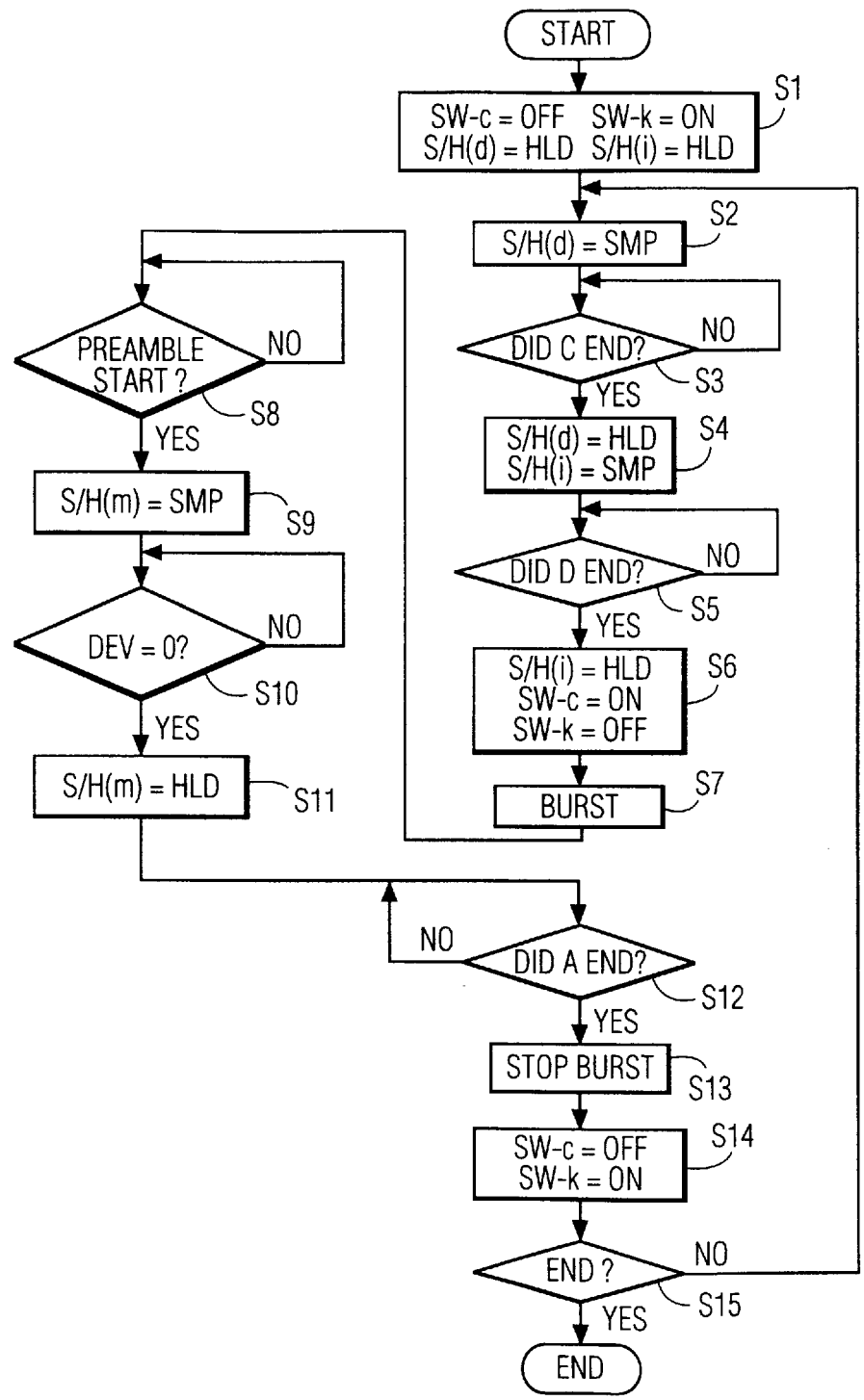
FIG. 8 is a flowchart showing operation of the radio apparatus of the third embodiment of the invention.

FIG. 7 is a structural diagram showing a fundamental composition of the main part of a radio apparatus of the second embodiment of the invention, and the same numbers as those in FIG. 9 are attached to the same components as shown in FIG. 9 showing the whole composition and as shown in FIG. 1 already explained. And FIG. 8 is a flowchart showing operation of the second embodiment.

A point in which a radio apparatus shown in FIG. 7 is different from the above-mentioned radio apparatus shown in FIG. 4 is that the sample holding circuit S/H (m) is controlled by detecting a phase difference by means of a phase difference detector 242 when a phase of a local oscillation signal to be supplied to the quadrature demodulator 204 from a local oscillator 230 is adjusted by a phase adjusting part 240.

Namely, as described above, in case of performing transmission in a frequency different from the frequency in which a phase adjustment has been performed, a negative feedback function of a linearizer may not work well due to a further phase lead or phase lag caused by variation of LC components of the circuit devices and variation in electrical path length. Hence, a phase adjustment is performed by making a feedback signal Qfb in a preamble part equal to the reference signal Qref in voltage.

In case that a linearizer has a slippage in phase, therefore, some output comes to appear on the Q signal side also in a preamble period, as shown by the above-mentioned expressions (1) and (2). Then, by paying attention to the Qref and a Qfb in the preamble period, it is possible to judge that they coincide also in phase with each other in case that they coincide in amplitude with each other and that they are deviated in phase from each other in case that they are different in amplitude from each other.

Hence, a phase adjustment is performed by continuing to sample a signal (S9 in FIG. 8) by means of the sample holding circuit S/H (m) until the phase difference detected by the phase difference detector 242 inside the phase adjusting part 240 becomes zero (S10 in FIG. 8).

And when the phase difference becomes zero (S10 in FIG. 8), the sample holding circuit S/H (m) holds a result of comparison in the preamble period (S11 in FIG. 8).

According to the result of holding, the phase of a signal from the local oscillator 230 is adjusted so as to adjust a slippage in phase by means of a phase shifter 241.

Thus, the second object of the invention can be achieved by performing a phase adjusting process in the respective steps S8 to S11 in FIG. 8. Namely, in case of using a linearizer, it is possible to automatically adjust a slippage in phase between the transmission system and the negative feedback system. As the result, compensation of linear characteristics of the power amplification stage by the linearizer is accurately performed.

And the third object of the invention can be achieved by performing all the steps S1 to S15 in FIG. 8. Namely, in case of using a linearizer, it is possible to automatically adjust slippages in offset voltage and in phase between the transmission system and the negative feedback system. The automatic adjustment of these slippages is performed in each transmission slot. The adjustment of these slippages in voltage and in phase is performed in each transmission slot. Therefore, the slippages are adjusted in an instant even in case of changing a transmission frequency.

As the result, compensation of linear characteristics of the power amplification stage by the linearizer is accurately performed.

As described in detail above, according to the invention for achieving the first object, an error voltage compensating means makes the respective offset voltages of signal components obtained by quadrature demodulation coincide with the respective offset voltages of signal components obtained by quadrature modulation through comparing the respective offset voltages of the signal components obtained by the quadrature demodulation during the periods other than transmission slot timing periods with the respective offset voltages of the signal components obtained by the quadrature modulation.

Accordingly, in case of using a linearizer, it is possible to automatically adjust a slippage in offset voltage between the transmission system and the negative feedback system. Further, the adjustment of this slippage in offset voltage is performed in each transmission slot. As the result, compensation of linear characteristics of the power amplification stage by the linearizer is accurately performed.

Further, according to the invention for achieving the second object, a phase adjusting means makes a signal component obtained by quadrature demodulation of a transmission signal coincide in phase with a signal component obtained by quadrature modulation through adjusting in phase a local oscillation signal to be supplied to the quadrature demodulator.

Accordingly, in case of using a linearizer, it is possible to automatically adjust a slippage in phase between the transmission system and the negative feedback system. As the result, compensation of linear characteristics of the power amplification stage by the linearizer is accurately performed.

And according to the invention for achieving the third object, an error voltage compensating means makes the respective offset voltages of signal components obtained by quadrature demodulation coincide with the respective offset voltages of signal components obtained by quadrature modulation through comparing the respective offset voltages of the signal components obtained by the quadrature demodulation during the periods other than transmission slot timing periods with the respective offset voltages of the signal components obtained by the quadrature modulation, and a phase adjusting means makes a signal component obtained by quadrature demodulation of a transmission signal coincide in phase with a signal component obtained by quadrature modulation through adjusting in phase a local oscillation signal to be supplied to the quadrature demodulator.

Accordingly, in case of using a linearizer, it is possible to automatically adjust a slippage in offset voltage and a slippage in phase between the transmission system and the negative feedback system. Further, the automatic adjustment of these slippages is performed in each transmission slot. Further, the adjustment of these slippages in voltage and in phase is performed in each transmission slot. Therefore, the slippages are adjusted in an instant even when a transmission frequency is changed. As the result, compensation of linear characteristics of the power amplification stage by the linearizer is accurately performed.

I claim:

1. A radio apparatus comprising:
    a modulator which modulates an input signal, receives an input offset voltage held by an input sample and hold circuit, and outputs an output signal having an output offset voltage;
    a demodulator which demodulates a signal derived from said output signal and outputs a demodulated signal; and
    an offset compensating circuit which makes said output offset voltage coincide with a demodulated offset voltage of said demodulated signal by comparing said input offset voltage with said demodulated signal in order to generate a feedback signal.

2. The radio apparatus of claim 1, wherein said offset compensating circuit compensates said input signal using said feedback signal and said input offset voltage.

3. The radio apparatus of claim 1, wherein said input sample and hold circuit samples said input signal during a period excluding a transmission slot to provide said input offset voltage.

4. The radio apparatus of claim 1, wherein said offset compensating circuit includes a feedback sample and hold circuit for sampling said feedback signal during a period excluding a transmission slot.

5. The radio apparatus of claim 1, wherein said offset compensating circuit includes a feedback sample and hold circuit for sampling said feedback signal during a first period, said input sample and hold circuit sampling said input signal during a second period, wherein said first and second periods are different from each other and are during a non-transmission slot.

6. The radio apparatus of claim 1, wherein said radio apparatus further comprises a phase adjusting circuit which makes a modulated phase of said output signal coincide with a demodulated phase of said demodulated signal by comparing said input offset voltage with said feedback signal in order to output a control signal.

7. The radio apparatus of claim 6, wherein said phase adjusting circuit comprises a phase shifter which outputs a phase adjust signal to said demodulator in response to said control signal.

8. The radio apparatus of claim 7, wherein said phase adjusting circuit further comprises a phase sample and hold circuit for sampling said control signal during a predetermined time which excludes a transmission slot, and for holding a sampled control signal during said transmission slot.

9. The radio apparatus of claim 8, wherein said phase adjusting circuit further comprises a phase detector for detecting a phase difference between said input offset voltage and said feedback signal in order to output a sample stop signal to said phase sample and hold circuit when said phase difference equals a predetermined value.

10. A radio apparatus comprising:

a modulator which modulates an input signal and outputs a modulated signal;

a demodulator which demodulates a signal derived from said modulated signal and outputs a demodulated signal; and an offset compensating circuit which compensates offset levels of said modulated and demodulated signals by comparing an input offset signal with a compensated demodulated signal to generate a feedback signal, said offset compensating circuit including a first sample and hold circuit for providing said input offset signal from said input signal and a second sample and hold circuit for sampling said feedback signal and providing a compensating signal for combining with said demodulated signal to form said compensated demodulated signal.

11. The radio apparatus of claim 10, wherein said radio apparatus further comprises a phase adjusting circuit which compensates phases of said modulated and demodulated signals by adjusting a phase of a local oscillating signal received by said demodulator in response to a control signal resulting from comparing said feedback signal with said input offset signal.

* * * * *